(12) United States Patent
Walker et al.

(10) Patent No.: US 10,586,408 B2
(45) Date of Patent: *Mar. 10, 2020

(54) VEHICLE SPEED-BASED ANALYTICS

(71) Applicant: Freeport-McMoRan Inc., Phoenix, AZ (US)

(72) Inventors: Mary Amelia Walker, Phoenix, AZ (US); Robert Catron, Phoenix, AZ (US); Nicholas Hickson, Phoenix, AZ (US); Brian Vaughan, St. Louis, MO (US); James Milne, St. Louis, MO (US)

(73) Assignee: Freeport-McMoRan Inc., Phoenix, AZ (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/985,230

(22) Filed: May 21, 2018

(65) Prior Publication Data

US 2018/0268625 A1    Sep. 20, 2018

Related U.S. Application Data

(63) Continuation of application No. 15/376,030, filed on Dec. 12, 2016, now Pat. No. 10,013,820.

(Continued)

(51) Int. Cl.
*G07C 5/08* (2006.01)
*G07C 5/00* (2006.01)
(Continued)

(52) U.S. Cl.
CPC ........... *G07C 5/0808* (2013.01); *G07C 5/008* (2013.01); *G07C 5/02* (2013.01); *G06F 16/29* (2019.01); *G06Q 10/20* (2013.01)

(58) Field of Classification Search
CPC ........ G07C 5/0808; G07C 5/008; G07C 5/02; G06Q 10/20; G06F 17/30241
See application file for complete search history.

(56) References Cited

U.S. PATENT DOCUMENTS 6,259,377 B1   7/2001  Noecker et al.
7,397,392 B2   7/2008  Mahoney et al.
(Continued)

OTHER PUBLICATIONS

PCT International Search Report and Written Opinion, corresponding to PCT Application No. PCT/US16/66382, dated Feb. 23, 2016, 10 pages.

(Continued)

*Primary Examiner* — Michael J Zanelli
(74) *Attorney, Agent, or Firm* — Fennemore Craig, P.C.

(57) ABSTRACT

A system for optimizing a travel speed of an off-road vehicle utilizes time-over-target values as a threshold indicator for diagnostics and subsequent remedial actions. A road used for haulage is divided into a plurality of predetermined road segments. A target transit time is defined for each of the predetermined segments to provide a target speed curve. An actual transit time values is measured for the off-road vehicle in transiting the road. A comparison outcome is generated by comparing the target transit time value with the actual transit time value. The comparison outcome is useful in adjusting the travel speed for the vehicle to minimize the time over target value.

20 Claims, 9 Drawing Sheets

Related U.S. Application Data

(60) Provisional application No. 62/267,486, filed on Dec. 15, 2015.

(51) Int. Cl.
- G07C 5/02 (2006.01)
- G06F 16/29 (2019.01)
- G06Q 10/00 (2012.01)

(56) References Cited

U.S. PATENT DOCUMENTS

| | | | |
|---|---|---|---|
| 7,769,561 | B2 | 8/2010 | Yuan et al. |
| 8,392,483 | B2 | 3/2013 | Lawrence |
| 8,554,468 | B1 * | 10/2013 | Bullock ............ G01S 19/14 701/408 |
| 8,559,937 | B2 | 10/2013 | Ram et al. |
| 8,655,823 | B1 | 2/2014 | Kumar |
| 8,870,057 | B2 | 10/2014 | Campbell et al. |
| 8,886,574 | B2 | 11/2014 | Yuan et al. |
| 2001/0014847 | A1 | 8/2001 | Keenan |
| 2005/0216826 | A1 | 9/2005 | Black et al. |
| 2007/0252734 | A1 | 11/2007 | Greiner et al. |
| 2008/0082347 | A1 | 4/2008 | Villalobos et al. |
| 2008/0243381 | A1 | 10/2008 | Villalobos et al. |
| 2009/0096637 | A1 | 4/2009 | Olson et al. |
| 2009/0099707 | A1 | 4/2009 | Greiner et al. |
| 2010/0201829 | A1 | 8/2010 | Skoskiewicz et al. |
| 2011/0029281 | A1 | 2/2011 | Tsukamoto |
| 2011/0112747 | A1 | 5/2011 | Downs et al. |
| 2011/0307165 | A1 | 12/2011 | Hiestermann et al. |
| 2014/0297182 | A1 | 10/2014 | Casson et al. |
| 2015/0167461 | A1 | 6/2015 | Sugihara et al. |

OTHER PUBLICATIONS

Supplementary European Search Report to corresponding European Patent Application No. EP16876490, dated Oct. 18, 2018, 13 pages.

European Examination Report, dated Aug. 27, 2019, European Patent Application No. 16 876 490.0, corresponding to PCT/US2016/066382, 7 pages.

Chinese Second Office Action, dated Sep. 5, 2019, with full English translation, Chinese Patent Application No. 201680070884.5, corresponding to PCT/US2016/066382, 9 pages.

Indonesian Substantive Examination Report Stage I, dated Sep. 19, 2109, with full English translation, Indonesian Patent Application No. PID201804792, corresponding to PCT/US2016/066382, 4 pages.

\* cited by examiner

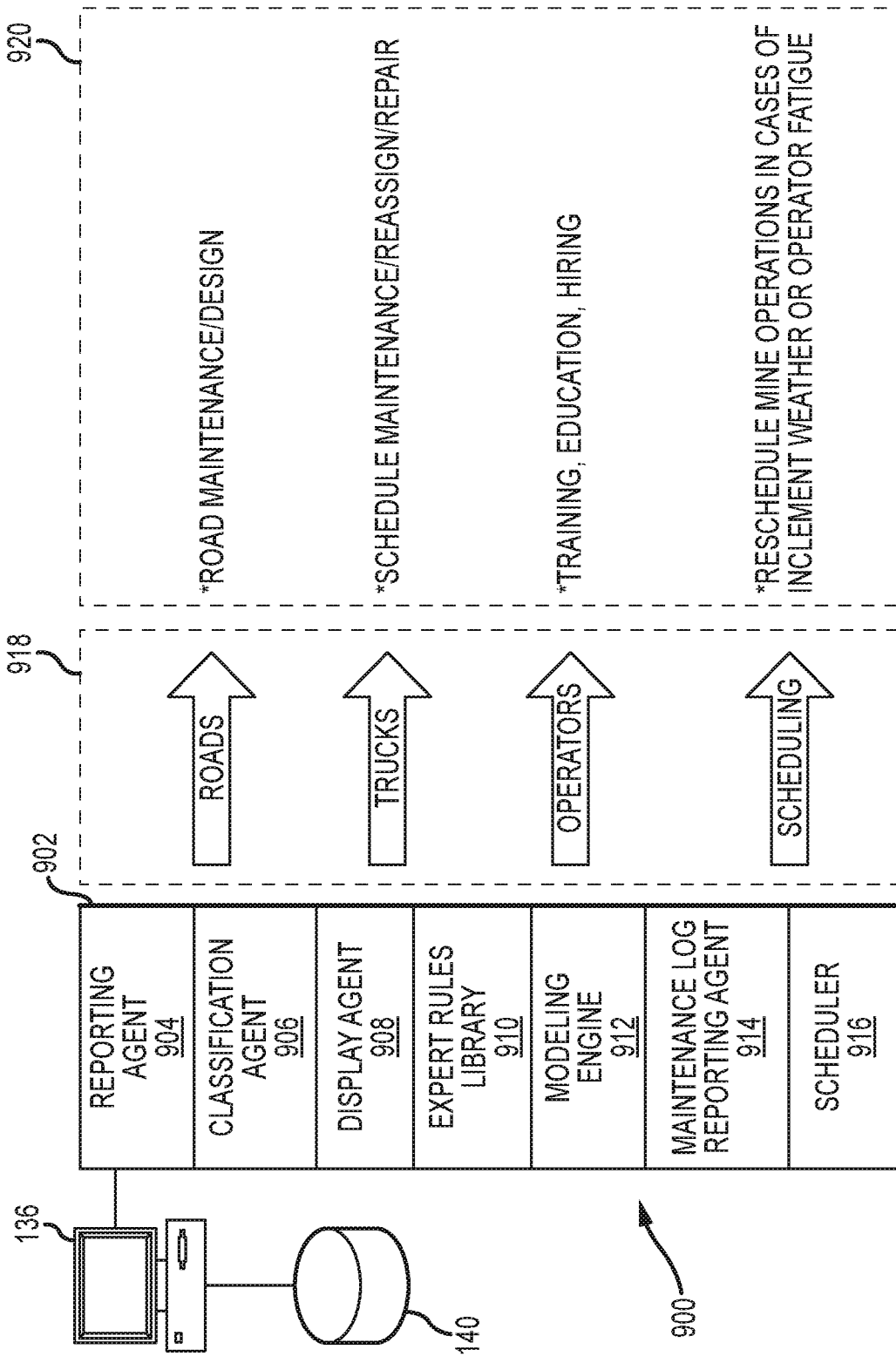

VEHICLE SPEED-BASED ANALYTICS

CROSS-REFERENCE TO RELATED APPLICATIONS

This application is a continuation of U.S. patent application Ser. No. 15/376,030, filed on Dec. 12, 2016, now U.S. Pat. No. 10,013,820, which claims the benefit of U.S. Provisional Patent Application No. 62/267,486, filed on Dec. 15, 2015, both of which are hereby incorporated herein by reference for all that they disclose.

BACKGROUND

1. Field

The presently disclosed instrumentalities relate to systems and methods of managing vehicle travel in general and, more particularly, to systems and methods of optimizing the travel speed of off-road haul trucks.

2. Description of the Related Art

Open pit mines utilize fleets of specialized vehicles that are specially adapted for heavy haul utilization. These vehicles include, for example, the Model 793F, 797F and MT4400D AC vehicles manufactured by Caterpillar of Peoria, Ill., which have nominal payload capacities ranging from 221 to 363 metric tonnes. These vehicles may be purchased on commercial order equipped with controller area network (CAN) systems.

Data from heavy haul vehicles may be broadcast for use at a monitoring station. This is shown, for example, in U.S. Pat. No. 7,987,027, which shows use of CAN technology on mining vehicles. A wireless transmission system provides for data download/upload functionality to an off-board monitoring system. The wireless transmission system pre-processes acquired machine data and combines data sets to reduce bandwidth in accommodating low-frequency, low bandwidth networks of a type commonly used in mines.

CAN systems such as these provide an overwhelming amount of data concerning the status of various vehicle components. System readings may include, without limitation, what gear the vehicle is operating in at a particular time; compositional analysis of engine exhaust contents such as soot, fuel vapor, carbon monoxide and the like; pressure differentials across such engine components as filters, blowers and the like; tire pressure; alternator output; battery voltage; temperatures including coolant temperature, oil temperature, cab temperature, brake temperature, external temperature and the like; intervals of brake activation; intervals of acceleration and deceleration; windshield wiper activation; grade of road; steering patterns indicative of operator fatigue; hydraulic pump output pressure; quantity of fuel on board, and suspension strut gas pressure. Utilization of this data is typically directed towards analytics for maintenance needs or monitoring of individual vehicles to assure operations within parameters as required under vehicle warranty. Generally speaking, the analytics have not progressed beyond these factors to facilitate improved fleet operations.

SUMMARY

The presently disclosed instrumentalities overcome the problems outlined above and advance the art by providing transport vehicle diagnostics that may be utilized to improve vehicle fleet operations. In particular, the vehicle diagnostics include a comparison outcome based upon the time that is required for a vehicle to accomplish a particular task versus a target time that should be achievable by the vehicle in accomplishing the task.

According to one embodiment, a method of optimizing a travel speed for a vehicle at a remote location includes dividing a road to be traversed by the vehicle into a plurality of predefined road segments. A target transit time value is determined for the vehicle in transiting each of the plurality of predefined road segments. An actual transit time value is ascertained for the vehicle as the vehicle travels over at least one of the predefined road segments. A comparison is made between the target transit time value and the actual transit time value for the at least one predetermined road segment to provide a comparison outcome. The comparison outcome is utilized an indicator to provide a resolution or recommendation affecting at least one of road quality at the remote location, vehicle maintenance, vehicle operator training and operational scheduling at the remote location. The remote location may be, for example, an open-pit mine.

According to one embodiment, the foregoing method is implemented in a system for optimizing a travel speed for an off-road vehicle. The system includes a telecommunications network and a vehicle. The vehicle includes a vehicle network having one or more sensors operatively associated with the vehicle for providing data selected from the group consisting of at least one of time and a speed of the vehicle. The vehicle also includes a transmitter configured to upload the data to the telecommunications network. A processing system is operatively associated with the telecommunications network to operate on the data. The processing system is configured with program logic to implement the foregoing method, which may result in maintenance operations to implement the resolution or recommendation according to the program logic. This implementation may include, for example, automated scheduling of maintenance operations according to a system of expert rules.

In one aspect, a conventional heavy haul truck may be improved by providing access a telecommunications network for the transfer of data to a system providing an analytical capability to implement the foregoing method. A database is configured to operate on data that is uploaded from the truck where the data is associated with a plurality of predefined road segments dividing a road to be traversed by a vehicle. A computer equipped with program logic determines a target transit time value for the vehicle in transiting each of the plurality of predefined road segments. This may be done, for example, using a lookup table or a correlation. The computer accesses the data to ascertain an actual transit time value for the vehicle as the vehicle travels over at least one of the predefined road segments. The computer compares the target transit time value and the actual transit time value for the at least one predetermined road segment to provide a comparison outcome. The computer optionally but preferably utilizes the comparison outcome as an indicator to provide a resolution or recommendation affecting at least one of road quality at the remote location, vehicle maintenance, vehicle operator training and operational scheduling at the remote location.

In one aspect, the program logic may be provided on a non-transitory computer-readable storage medium having computer-executable instructions embodied thereon that, when executed by at least one computer processor cause the processor to perform the foregoing method. The non-transitory computer-readable storage medium may be, for example, a computer hard drive, a flash memory stick, or a CD-ROM.

BRIEF DESCRIPTION OF THE DRAWINGS

Illustrative and presently preferred exemplary embodiments of the invention are shown in the drawings in which:

FIG. 9 shows post-processing that may occur downstream of a $TOT_i$ comparison outcome for purposes of improving operation efficiency of an industrial operation where haulage is involved.

DETAILED DESCRIPTION

Figure 1:
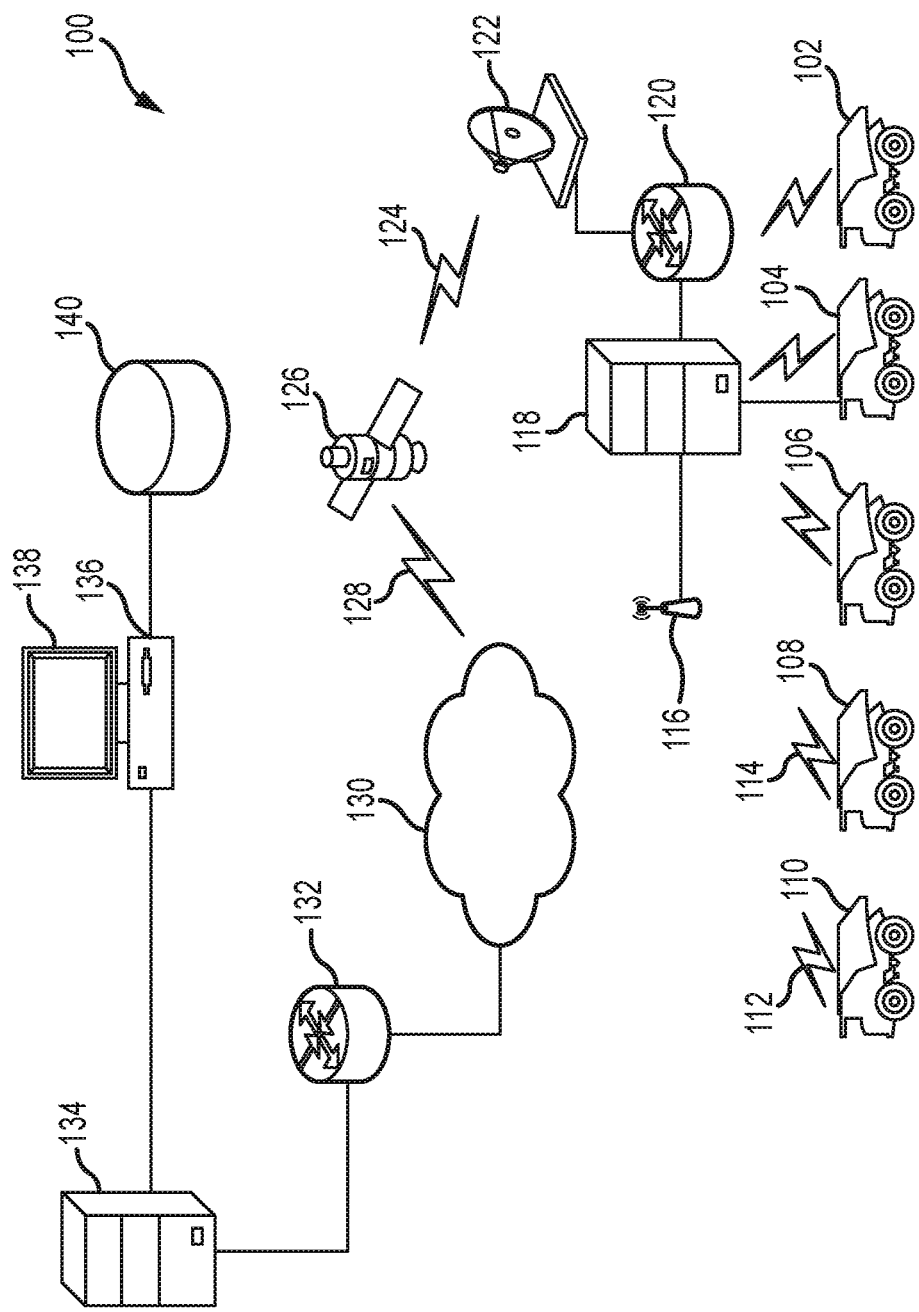
FIG. 1 is a schematic representation of one embodiment of a system for assessing $TOT_i$ values for vehicles according to the presently disclosed instrumentalities.

FIG. 1 shows one embodiment of a system 100 used to optimize the travel speeds of one or more vehicles, such as haul trucks 102, 104, 106, 108, 110. Each of the haul trucks is equipped with a two-way wireless communications linkage, such as linkages 112, 114 respectively incorporated in haul tucks 108, 110. The linkages 112, 114 are in wireless communication with one or more wireless access points 116, such as a radio tower or a Bluetooth Scatternet, which is constructed and arranged to provide wireless communications from a remote location such as an open pit mine or lumbering operation. The wireless access point 116 communicates data to and from a server/router combination 118/120. The router 120 processes packetized communications from the remote location through satellite dish 122, utilizing communications linkage 124 to communicate with a satellite network 126. The satellite network 126 communicates through commercial linkages 128 established by one or more commercial service providers to gain access to the Internet 130 for communication with router/server combination 132/134. Data from server 134 is accordingly provided to computer 136 and stored on database 140. It will be appreciated that the computer 136 with associated display 138 and database 140 may be located at a central location, but also that the associated computing and data storage functionalities described below may be distributed, as in the case of distributed databasing and/or massively parallel computing. Moreover, the network design may vary by methods known to the art to accommodate an infinite number of hardware choices based upon the need of any particular location. For example, the satellite 126 is unnecessary if there is a different telecommunications network available, or if the central computer 136 is located at a remote location such as a mine. There may be any number of haul trucks 102-110, and the computer 136 may be used to monitor more than one remote location.

The haul trucks 102-110 form a fleet of trucks in used at a particular location, such as a mine or lumbering operation. Each of these trucks are equipped with a vehicle network (not shown). The vehicle networks provide data sense and reporting functionalities that facilitate monitoring of vehicle components. Commercially available vehicle networks include, for example, Local Interconnect Networks ("LIN;" see ISO 9141 and ISO 17987) suited for low date rate applications, Controller Area Networks ("CAN;" see ISO11898) for medium data rate applications; and FlexRay (ISO 17458) for safety critical applications. A haul truck may contain more than one vehicle network.

The vehicle networks are frequently CANs. CAN is a multi-master serial bus standard for connecting Electronic Control Units, which function as nodes on the CAN. Two or more nodes are required on the CAN network to communicate. The node may be a simple I/O device or an embedded computer with a CAN interface and sophisticated software. The node may also be a gateway allowing a standard computer to communicate over a USB or Ethernet port to the devices on a CAN network. CANs have been used to monitor sensors in a variety of application including, without limitation, brake sensors, wheel sensors, pitch/roll/yaw sensors, fluid level sensors (fuel, oil, hydraulic fluid, etc.), hydraulic cylinder position sensors, truck bed position sensors, bucket/blade/implement position sensors, tire health sensors (pressure, temperature, tread, etc.), exhaust sensors (temperature, NOx, etc.), engine sensors (engine speed, engine load, fuel pressure, boost pressure, etc.), transmission sensors (gear, input/output speed, slip times, etc.), torque converter sensors (input speed, output speed, temperature, etc.), various other machine parameter sensors (payload, strut pressure, machine speed, etc.), and various operator cabin sensors (vibration, ignition key presence/position, seat position, seat belt position, door position, and settings/positions of operator controls, etc.).

Figure 2:
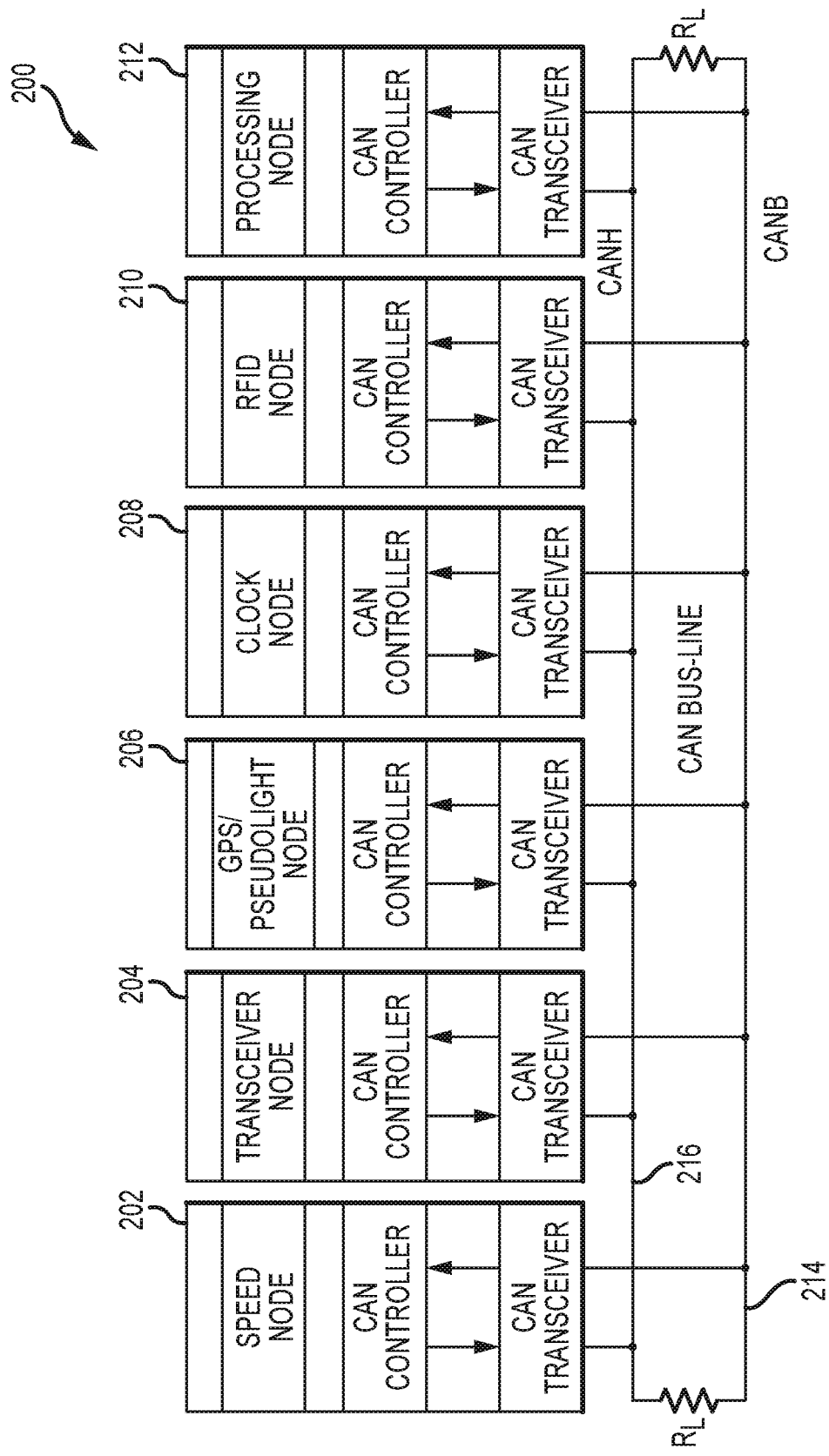
FIG. 2 shows a CAN network that may be used to equip one or more of the vehicles of FIG. 1.

FIG. 2 shows a network schematic that represents individual vehicle networks found on each of the haul trucks 102-110. As illustrated, the network 200 is a controller area network ("CAN"), but in alternative embodiments may also be a LIN, MOST, FlexRay or other type of vehicle network.

Network 200 is a multi-master network utilizing the CAN multi-master architecture as is standardized in the art. Each node, such as nodes 202, 204, 206, 208 210, 212, includes a node controller and a transceiver configured to receive and transmit data on a CAN Bus-line including CANB component 214 and CANH component 216. The components 214, 216 are useful in arbitrating to resolve or arbitrate data low priority versus high priority data transmission conflicts as is known to the art. Each node of nodes 202-212 is configured to provide a particular functionality. Thus, node 202 provides sensor output indicative of vehicle speed. This may be done, for example, by measuring revolutions per minute (rpm) as the rotational speed of a wheel or transaxle using a magnetic pickoff that counts the incidents of magnetic field proximity variations proximate a sensor over an interval of time as an indicator of vehicle speed. As an alternative way to assess vehicle speed, node 202 may provide output indicating vehicle speed as represented on an operator's dashboard display, where the vehicle speed may be determined by any system known to the art. Node 204 is a transceiver configured to transmit and receive data on system 100. Node 206 may provide output from a Global Positioning System (GPS) to associate vehicle location with a particular time. Node 208 includes a digital clock or timing circuit that may provide a time stamp for any data transmission on network 200. Node 210 provides output indicating that a vehicle-mounted Radio Frequency IDentification (RFID) tag or other proximity detection system has been activated by proximity to short range or near-field circuitry dedicated to that purpose. A processing node 212 may filter, delimit, screen or operate on data transmitted for the purposes described herein.

As will be appreciated by those of ordinary skill in the art, the network 200 is not strictly limited to the nodes shown in FIG. 2, nor is it necessary that the network 200 have all of the nodes shown in FIG. 2. By way of example, network 200 may also comprise one or more environmental sensors (not shown), for example, including light sensors, rain sensors, fog sensors, and night sensors as described in European Patent Publication EP19980956367 to Schofield et al., These sensors may be utilized as CAN nodes for sensing certain environmental conditions, such as the presence of rain, snow, or fog, at various locations within the environment. All types of data on the network 200 may be transmitted on system 100 (see FIG. 1). The processing node 212 may also operatively connect to one or more display systems (not shown) to display certain information and data to a driver. It is possible to utilize CAN-based technology to monitor virtually every operational aspect of a vehicle.

Figure 3:
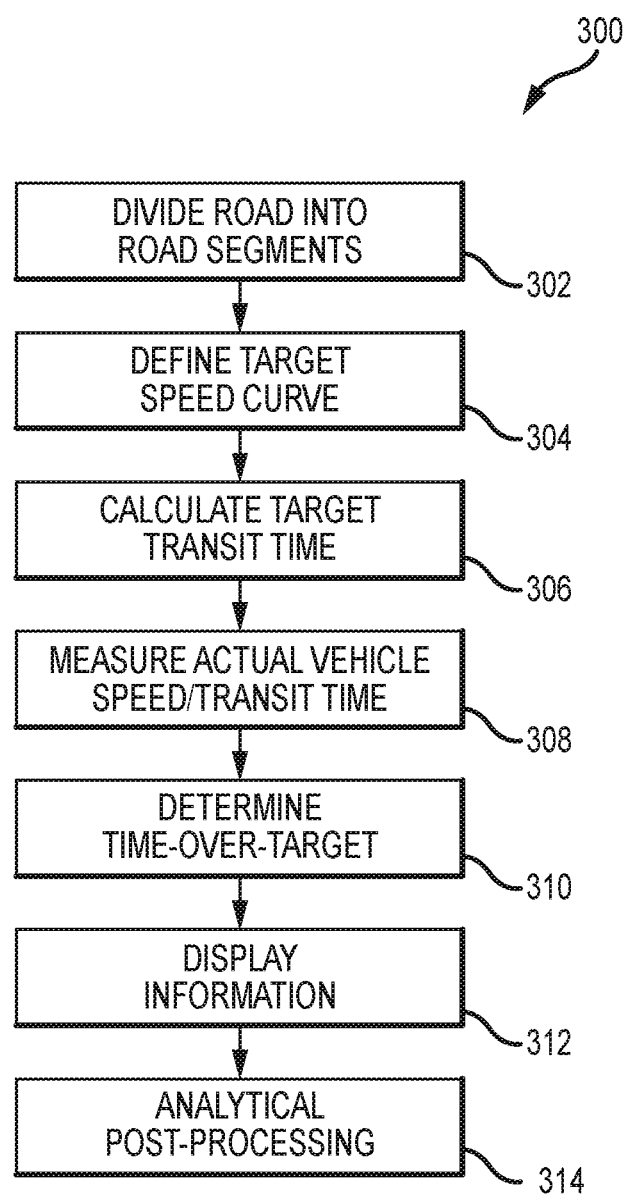
FIG. 3 is a flow chart of one embodiment of a method of utilizing $TOT_i$ comparison outcomes as a threshold indicator of vehicle operations and diagnostics where the method of FIG. 3 may be implemented as software programming a computer with machine instructions for the performance of this method.
Figure 4:
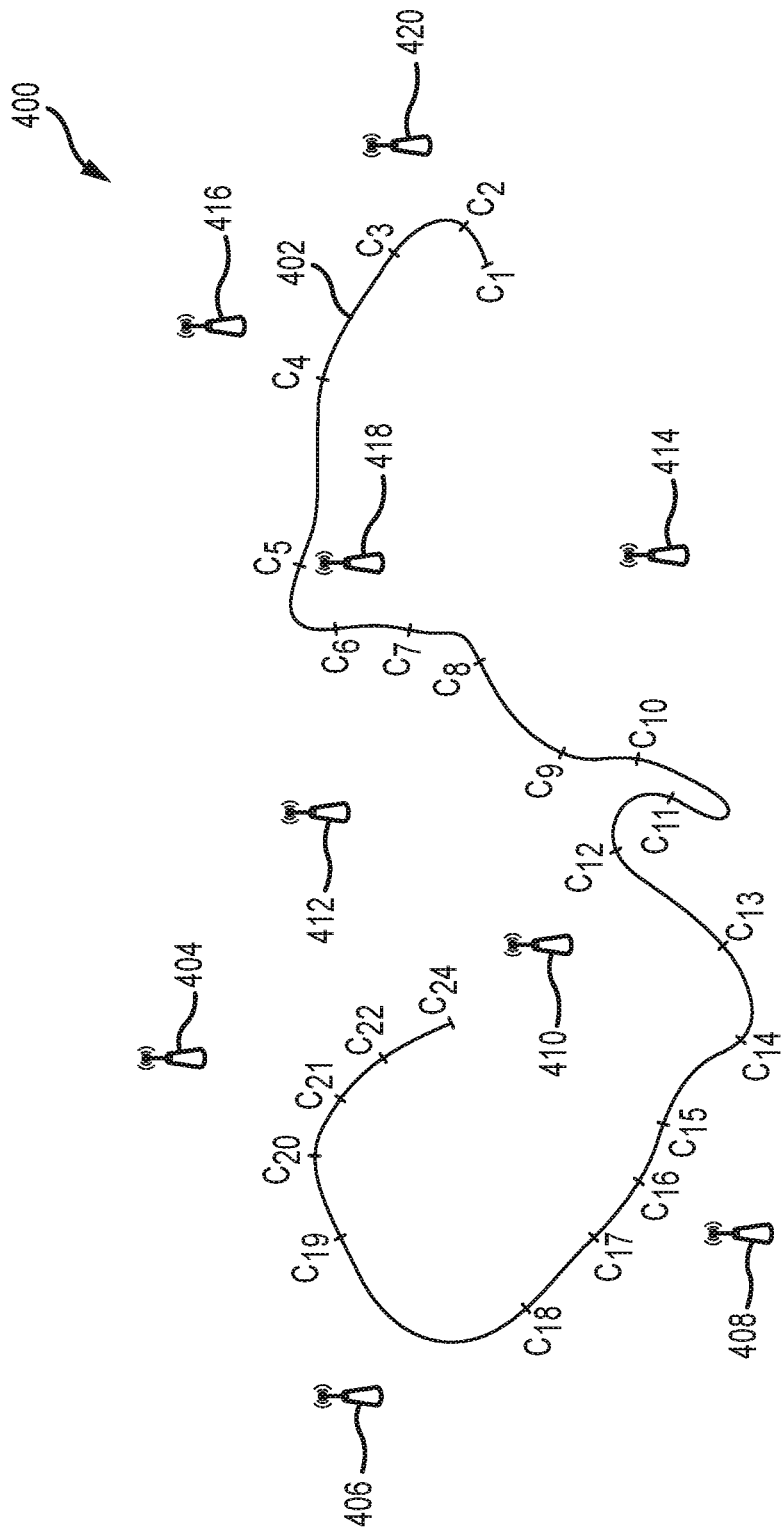
FIG. 4 shows a road that has been divided into predetermined segments for use in the method of FIG. 3.

FIG. 3 shows program logic implementing a method 300 of calculating $TOT_i$ values for use as described herein. The program logic may be implemented, for example, on computer 136 of system 100 or the processing node 212 of network 200. Step 302 entails dividing a road into one or more predetermined segments. This is shown, by way of example, in context of a remote location 400 including mine road 402, as shown in FIG. 4. Road 402 extends between a dump site at location $C_1$ and proceeds between sequentially numbered segments $C_2$, $C_3$, $C_4$, etc. . . . to a loading point at location $C_{34}$. Accordingly, road 402 proceeds between positionally sequential segments $C_1$ to $C_2$, $C_2$ to $C_3$, $C_3$ to $C_4$, etc. . . . . It will be appreciated that these segments may be combined for analytical purposes, such as by defining a segment $C_1$ to $C_4$ that includes all of segments $C_1$ to $C_2$, $C_2$ to $C_3$, $C_3$ to $C_4$.

Each segment may be selected based upon a commonality of factors affecting vehicle speed. These factors include, for example, one or more factors selected from the group including: (1) grade, (2) width of road, (3) curvature of road, (4) quality of road surface, (5) multiple vehicle transit rate, (6) environmental conditions, (7) payload of truck, (8) operator input, and (9) historical experience indicating differences in actual vehicle transit speeds. There may be any number of callouts $C_i$, where also a particular remote location 400 may have many different roads and some of these roads may share segments. While in the case of shared road segments it is not strictly necessary that each segment have a unique identifier in the system, it is preferred that each segment have a unique identifier because this practice permits uniform comparisons to be made for haulage over the same predetermined section of road.

Alternatively, the callouts $C_1$ to $C_{34}$ need not be associated with any particular feature or condition of the road and, instead, may be assigned at periodic callouts that are determined for example, at equidistant spacing. Generally speaking, increasing the number of callouts improves the analysis because shorter road segments $C_i$ will permit more resolution or "granularity" of the $TOT_i$ values established for the road 402.

Transceivers 404, 406, 408, 410, 412, 414, 416, 418, 420 form part of an optional pseudo-satellite system (the transceivers being referred to as pseudo-lites) that provides positional tracking of vehicles at the remote location 400. The pseudo-lite system may be, for example, a system as described in U.S. Pat. No. 6,031,487 issued to Mickelson. In addition, each of the segment callouts $C_1$ to $C_{34}$ on road 402 may be optionally equipped with RFID proximity detectors that emit a signal that is detectable by RFID node 210 to confirm the physical presence of a particular haul truck at the segment callout.

Once the road segments are determined in step 302, it is possible to define a target speed curve 304 that provides target speeds for each of the road segments defined in step 302. Where the distance of each road segment is also known, it is possible to calculate 306 a target transit time according to Equation (1):

$$t_i = D_i/S_i, \text{ where} \tag{1}$$

i is an integer or other value indicating a predetermined road segment, such as a segment of road 402, $t_i$ is a target transit time for the predetermined road segment, $D_i$ is a distance associated with the predetermined road segment, and $S_i$ is a target speed or velocity for the predetermined road segment contributing to the overall target speed curve for road 402 as defined in step 304. It will be appreciated that the values $t_i$ and $S_i$ may be utilized as target time values as described below.

The transit time so determined from the target speed curve provides a uniform basis for comparison; however, the comparison may alternatively be based upon vehicle velocity acceleration, momentum or kinetic energy. The simplest case for a target speed curve is to utilize a manufacturer's recommendations for what operational speeds a vehicle is capable of reaching under environmental conditions of load and grade. Practical experience has shown, however, that these recommendations are usually optimistic, except in the case of travelling empty on a downhill grade. Moreover, the speeds may vary considerably by make and model of vehicle.

It is possible to improve the comparison results by providing an experiential model that is specific to vehicle type considering, for example, actual driving results and/or input from expert vehicle operators. The model ideally provides an achievable target speed for each road segment as a function of any combination of input parameters including, for example, (1) grade, (2) width of road, (3) curvature of road, (4) quality of road surface, (5) whether slow and fast vehicles co-exist on the road segment, (6) environmental conditions, and (7) existing payload of truck. The model may include operator input as a system of expert rules. By way of example, a target speed curve may be calculated according for a Caterpillar 793B and 793D trucks using a model according to a lookup table, which may be for example a lookup table based upon actual experience in a working mine as shown Table 1.

TABLE 1

Haul Truck Target Speed Parameters

| Make | Model | Status | Grade | Speed (mph) |
|---|---|---|---|---|
| Caterpillar | 793B | Loaded | Uphill Speed | 7 |
| Caterpillar | 793B | Loaded | Downhill Speed | 10 |
| Caterpillar | 793B | Loaded | Flat Speed | 26 |
| Caterpillar | 793B | Empty | Uphill Speed | 15 |
| Caterpillar | 793B | Empty | Downhill Speed | 23 |
| Caterpillar | 793B | Empty | Flat Speed | 30 |
| Caterpillar | 793D | Loaded | Uphill Speed | 7.8 |
| Caterpillar | 793D | Loaded | Downhill Speed | 10 |
| Caterpillar | 793D | Loaded | Flat Speed | 26 |
| Caterpillar | 793D | Empty | Uphill Speed | 15 |
| Caterpillar | 793D | Empty | Downhill Speed | 23 |
| Caterpillar | 793D | Empty | Flat Speed | 30 |

While the target speeds represented in Table 1 summarize the general grades of road as being either uphill, downhill or flat, it will be appreciated that a particular make and model of truck may have a speed that varies more granularly as a function of altitude and angle of grade. Due to gearing and turbocharger considerations, the target velocity curve from, for example, a grade of −12 degrees to −5 to 0 to 5 may be curved or nonlinear. Curves such as these may be correlated from actual vehicle speeds based upon experience with a particular haulage operation. The discussion of FIGS. 7 and 8 below provides an optional but preferable embodiment showing, by way of example, how to calculate the target speed curve from an experientially based correlation instead of a lookup table.

Figure 5:
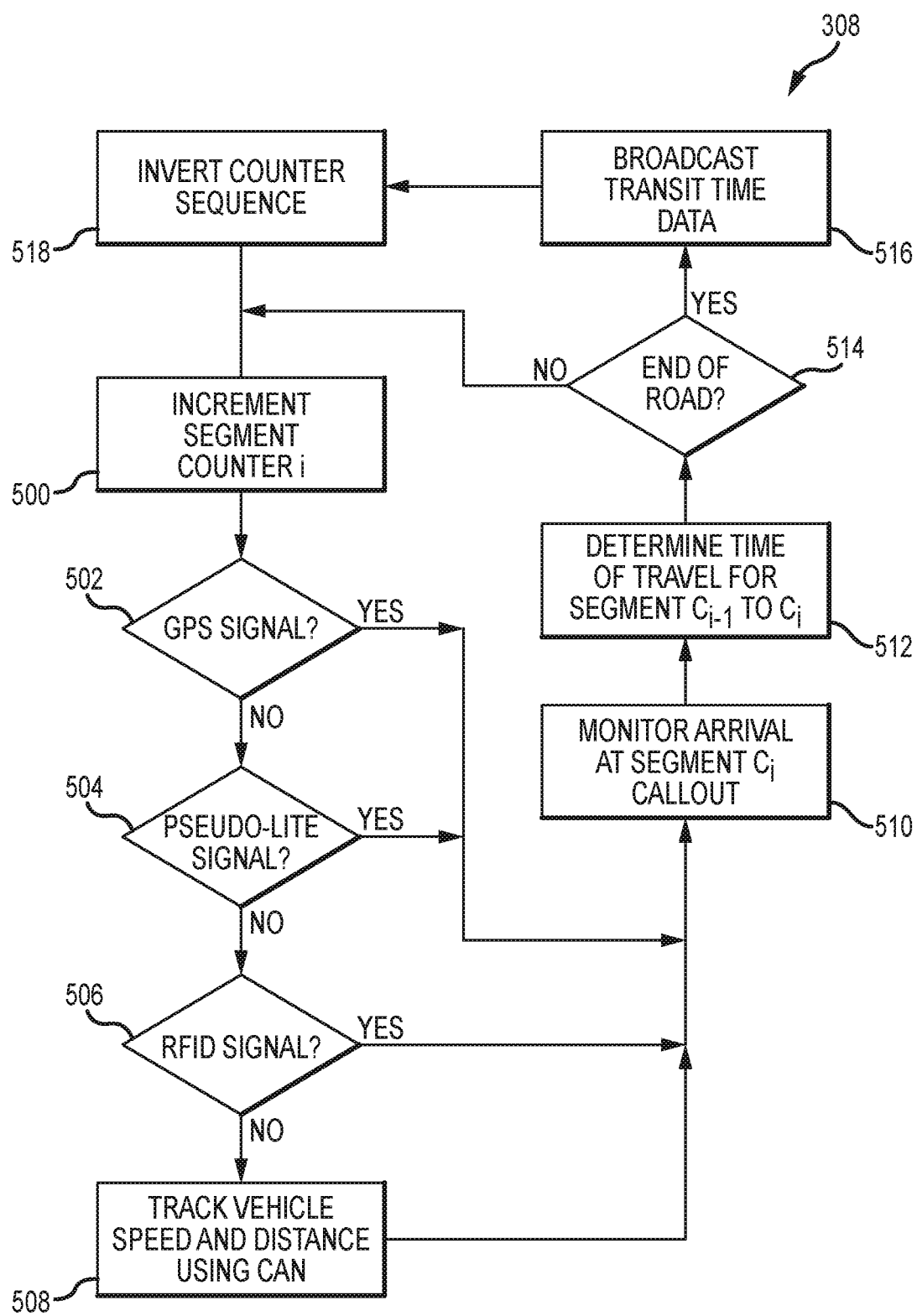
FIG. 5 is a process diagram that provides additional detail about the performance of a method step from FIG. 3 according to one embodiment.

A haul truck transits the road 402 while the network 200 measures 308 the actual vehicle speed and/or transit times over each of the predetermined segments of road 402. FIG. 5 provides additional detail on the performance of step 308 according to one embodiment that prioritizes the calculation of transit time value according to different navigation options. FIG. 5 shows a form of process 308 that may be implemented on a computer using program logic or software. By way of example, the software may run as executable code on computer 136 of system 100 or on processing node 212 of network 200.

It will be appreciated that GPS data is relatively accurate if it can be acquired; however, certain operating environments, such as pit mines or locations in forests or proximate mountainsides, interfere with GPS satellite signals that are primarily line-of-sight. Accordingly, it is possible to provide a plurality of alternative navigation options and to prioritize which one of these will provide the dominant form of navigation for calculation of transit time values when a haul truck is traversing road 402.

At the commencement of process step 308 as represented in FIG. 5, the haul truck is located at a callout on road 402, such as callout $C_1$. A counter is incremented 500 to indicate the next callout in positional sequence and provide a distance between the present location and the next callout. If a useable GPS signal is available 502 then the process utilizes that signal to monitor 510 and ascertain position of the haul truck as the haul truck arrives at the physical location of the next callout that was identified in step 500. If a usable GPS signal is not present, processing advances to step 504 which inquires whether a usable pseudo-light signal is available. If a usable pseudo-light signal is available, then the process utilizes the pseudo-light signal to monitor 510 and ascertain position of the haul truck as the haul truck arrives at the physical location of the next callout that was identified in step 500. If a usable pseudo-light signal is unavailable then processing advances to step 506, which inquires whether the next callout on road 402 is equipped with RFID functionality. If the callout is so equipped with RFID, then the process utilizes the RFID signal to monitor 510 and ascertain the position of the haul truck as the haul truck arrives at the physical location of the next callout that was identified in step 500. If the next callout is not equipped with RFID functionality, processing advances to step 508 which utilizes data from speed node 202 and clock node 208 to calculate a total distance traveled. Alternatively, the distance traveled may be determined from an odometer reading. When this distance equals the known distance to the next callout indicated by step 500, processing in step 510 ascertains that the haul truck is located at that next callout.

The clock of node 208 may polled to determine 512 a transit time between the successive callouts on road 402 for a predetermined segment of road. Alternatively, the distance associated with the road segment, such as road segment $C_1$ to $C_2$, may be divided by the average speed over the transit time to ascertain an average transit time. The average speed may be ascertained, for example, by accumulating the sensed speed at intervals of one second and dividing by the number of seconds.

If the haul truck has not reached the end of the road 402, as determined at step 514, then processing proceeds to step 500 to again increment the counter indicating the next segment of road and the process described above repeats itself for the next road segment, such as road segment $C_2$ to $C_3$ following segment $C_1$ to $C_2$. If the haul truck has 504 reached the end of road 402, then the process broadcasts 516 the transit time value data or, alternatively, any data needed to calculate the transit time value. The counter sequence is then inverted 518, for example, by multiplying the counter array i by −1, and the counter may be incremented as before for the return trip along road 402. In this way the process provides transit time values for each segment of road 402, such as segment $C_1$ to $C_2$.

Returning now to FIG. 3, processing step 308 entails determining the $TOT_i$ value for each of the predetermined road segments. This may be done, for example, according to Equations (2) through (10) below, which represent different options that may be used for calculating the value otherwise represented herein as $TOT_i$:

Comparison outcomes based upon actual time $$TOT_{ti} = AT_i - TT_i, \text{ where} \qquad (2)$$

i is an integer that identifies a particular road segment, $TOT_{ti}$ is time-over-target value for the road segment i, $AT_i$ is actual transit time for the road segment i (see e.g., step 512 of FIG. 5); and $TT_i$ is a target time value for the road segment i.

$$TOT_{ti} = (AT_i - TT_i)/TT_i \qquad (3)$$

$$TOT_{ti} = AT_i/TT_i \qquad (4)$$

Comparison outcomes based upon velocity $$TOT_{vi} = AV_i - TV_i, \text{ where} \qquad (5)$$

$TOT_{vi}$ is a velocity-based time-over-target value for the road segment i, $AV_i$ is actual average velocity for the road segment i (see e.g., step 512 of FIG. 5); and $TV_i$ is a target average velocity for the road segment i.

$$TOT_{vi} = (AV_i - TV_i)/TT_i \qquad (6)$$

$$TOT_{vi} = AV_i/TV_i \qquad (7)$$

Comparison outcomes based upon acceleration between road segments $$TOT_{ai} = [(AV_i - TV_i)/t_i - (AV_{8-1} - TV_{i-1})/t_{i-1}] \text{ where} \quad (11)$$

$TOT_{ai}$ is an acceleration-based time-over-target value for the current road segment i, $AV_i$ is actual average velocity for the current road segment i (see e.g., step 512 of FIG. 5); $TV_i$ is a target average velocity for the current road segment i, $t_i$ is the actual transit time for the prior road segment i, $AV_{i-1}$ is actual average velocity for the prior road segment i (see e.g., step 512 of FIG. 5); $TV_{i-1}$ is a target average velocity for the prior road segment i−1.

Comparison outcomes based upon momentum $$TOT_{Mi} = AM_i - TM_i, \text{ where} \quad (8)$$

$TOT_{Mi}$ is a momentum-based time-over-target value for the road segment i, $AM_i$ is actual vehicle momentum according to average velocity for the road segment i (see e.g., step 512 of FIG. 5); and $TM_i$ is a target vehicle momentum according to a target average velocity for the road segment i.

$$TOT_{Mi} = (AM_i - TM_i)/TT_i \quad (9)$$

$$TOT_{Mi} = AM_i/TM_i \quad (10)$$

Comparison outcomes based upon kinetic energy $$TOT_{Ki} = (mAV_i^2 - mTV_i^2)/2 \text{ where} \quad (8)$$

$TOT_{Ki}$ is a kinetic energy-based time-over-target value for the road segment i, $AV_i$ is an average vehicle velocity for the road segment i (see e.g., step 512 of FIG. 5); $TV_i$ is a target vehicle average velocity for the road segment I, and m is mass of the vehicle including payload of the vehicle.

The foregoing examples teach by way of example and not by limitation. It will be appreciated that a variety of comparisons may be provided as differences or ratios relating $TOT_i$ values to target transit time values.

Figure 6:
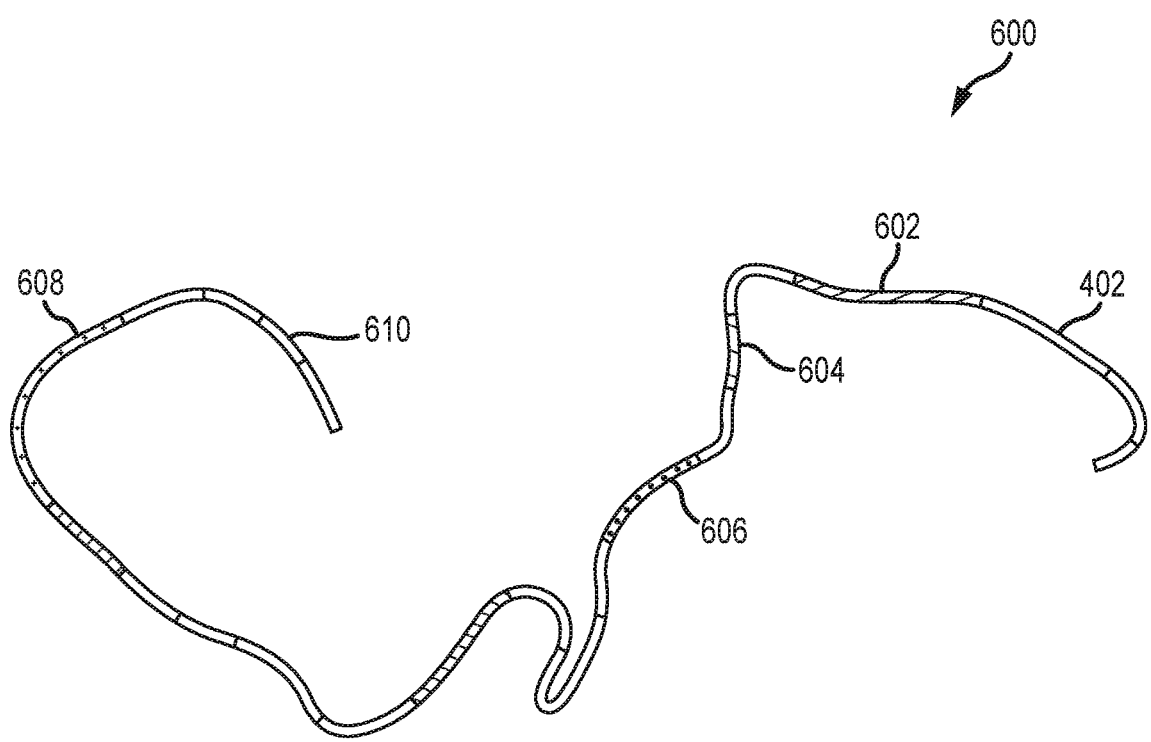
FIG. 6 is a heat map that may be generated by use of a comparison outcome produced according to the method of FIG. 3 showing classified $TOT_i$ values according to a presentation scheme that may be hashed or colorized to indicate a relative scale of vehicle performance on the predetermined segments of the road shown in FIG. 4.

Once the $TOT_i$ values are complete, they may be presented to a system user using, for example, display 138 (see FIG. 1). In one aspect, the $TOT_i$ values may be further processed for classification on a relative scale of the various segments of road interspersing the respective callouts $C_1$ to $C_{24}$. The classified values may then be presented on display 138 as a TOT "heat map" 600, as best seen in FIG. 6. The heat map 600 presents the calculated $TOT_i$ values for the various segments of road 402. The $TOT_i$ values have been classified into ranges, such that sections hashed in the manner of section 602 indicate negative values that possibly indicate an unsafe operating condition or, otherwise, an operating condition that possibly causes damage to the haul truck by operating in a gear that is too high or too low for prevailing environmental conditions. Sections of road hashed in the manner of section 604 indicate a transit time that is significantly more than the target transit time. Sections of road hashed in the manner of section 606 indicate a transit time that is problematically more than the target transit time, but less problematically so than the class of section hashed in the manner of section 604. Sections of road hashed in the manner of section 608 are the worst case classification. Unmarked or white sections of road such as section 610 represent negligible values, i.e., wherein the measured transit time was about equal to the target transit time.

One manner of performing this classification is to divide the $TOT_i$ values by the distance of the associated section $C_i$. The resulting time per distance values may be segregated for classification, for example, into quartiles, pentiles, or deciles. As shown in FIG. 6, the heat map 600 presents these classifications with use of hashing, but the presentation may also be colorized. It will also be appreciated that layering may be utilized to enhance the heat map 600 where, for example, the callouts $C_1$ to $C_{24}$, the pseudo-lite system, and/or topographical contours (not shown) may assist human interpretation of heat map 600.

Figure 7:
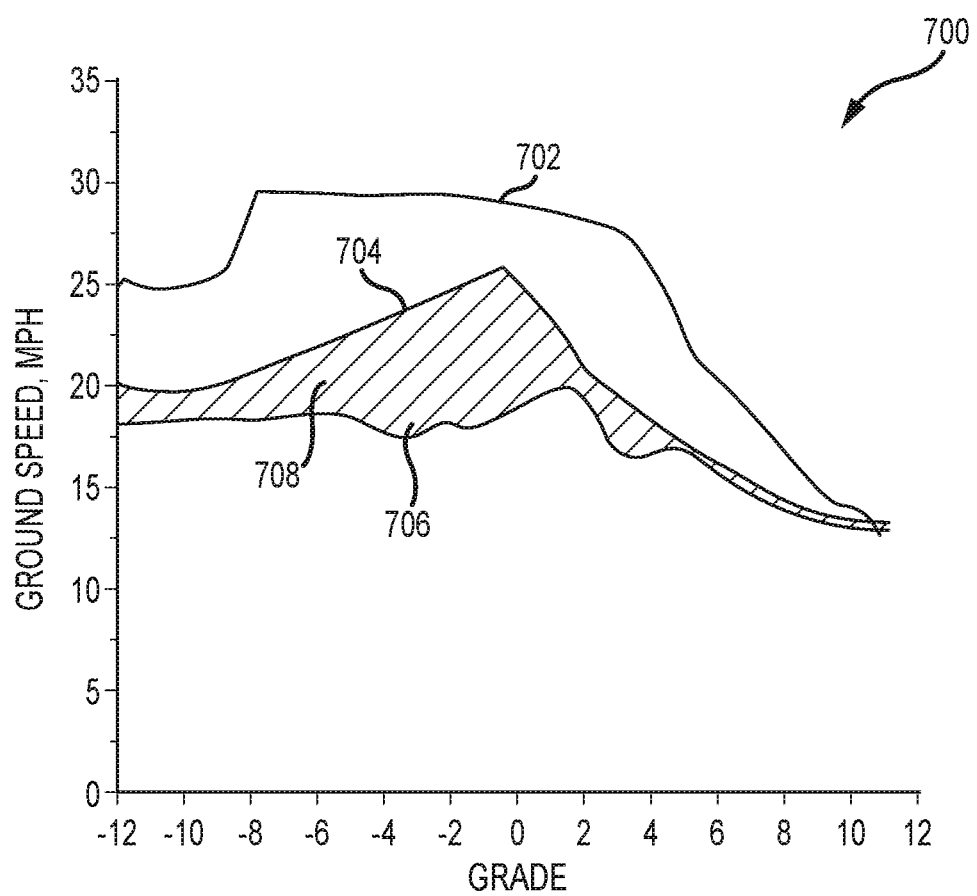
FIG. 7 is an exemplary plot of a target speed curve for an unloaded off-road vehicle illustrating various target off-road vehicle speeds for various road grades.

FIG. 7 provides, by way of example, an optional but preferable use of $TOT_i$ values from an actual operations environment in an open pit mine. Graphical display 700 is a comparative analysis showing curve 702, which represents manufacturer recommended speeds for an empty truck transiting particular grades of road. Curve 704 is a target speed curve showing the outcome of what speeds are achievable at grade on a particular road in an actual open mine according to a panel of expert equipment operators for a certain type of haul truck when the truck is empty. Curve 706 shows actual velocities obtained from a truck transiting the road. Thus, area 708 between the curves 704, 706 represents room for improvement that may be achieved by managerial intervention. In one actual example for a particular open pit mine, the majority of area 708 is primarily on downhill grade. For a fleet of similarly situated trucks in this same mine, just the downhill haulage portion of area 708 represented annually a savings opportunity of 15,600 haulage hours.

Figure 8:
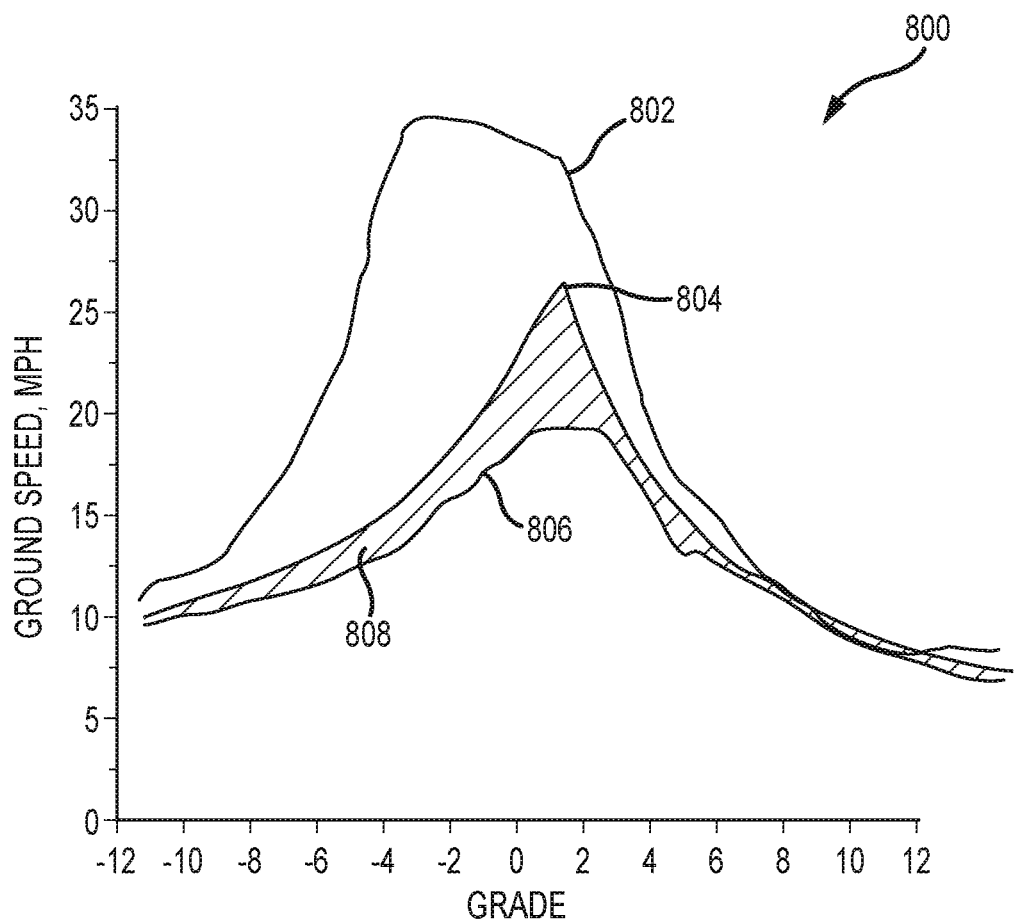
FIG. 8 is an exemplary plot of a target speed curve for a fully loaded off-road vehicle illustrating various target off-road vehicle speeds for various road grades.

FIG. 8 provides, by way of example, an optional but preferable use of $TOT_i$ values from an actual operations environment in an open pit mine. Graphical display 800 is a comparative analysis showing curve 802, which represents manufacturer recommended speeds for a fully loaded truck transiting particular grades of road. Curve 804 is a target speed curve showing the outcome of what speeds are achievable at grade on a particular road in an actual open mine according to a panel of expert equipment operators for a certain type of haul truck when the truck is fully loaded. Curve 806 shows actual velocities obtained from a truck transiting the road. Thus, area 808 between the curves 804, 806 represents room for improvement that may be achieved by managerial intervention. In one actual example for a particular open pit mine, the majority of area 808 is primarily on downhill grade. For a fleet of similarly situated trucks in this same mine, just the downhill haulage portion of area 808 represented annually a savings opportunity of 15,200 haulage hours.

Returning now to FIG. 3, post-processing 312 provides a variety of additional uses for the $TOT_i$ values where various aspects of the post-processing may facilitate closing the opportunity gaps represented by areas 708 and 808. FIG. 9 shows a program architecture 900 for accomplishing the post-processing 312 according to one embodiment. In the architecture 900, computer 136 is constructed and arranged to report from database 140, which contains uploads of operational data from trucks 102-112 (see FIG. 1). Computer 136 is provided with a graphical computer interface (GUI) facilitating the program functionalities as represented in bar 902. The program functionalities are implemented by software in the programming of computer 136.

In one aspect, a user may interact with a reporting agent 904, which may be for example a SQL-based reporting agent when the database 140 is a relational database. The reporting agent graphically assists a user in selecting fields from the structure of database 140 for ease of reporting. Thus, for example, it is possible to combine variables from a plurality of vehicles, average the values, and present the average values in a comparison analysis against similar variables for one or more vehicles.

A classification agent 906 permits the user to group values into classes of values, such as quartiles or, alternatively, values outside of normal ranges that may be of particular importance. For example, as discussed above, an abnormally low pressure differential across a blower (turbocharger) may diagnose a need for repair in a sick truck having relatively high $TOT_i$ values when travelling uphill, and this condition does not necessarily result in triggering a manufacturer's alarm. A display agent 908 facilitates graphical review of the reported data and/or classification results. This may be provided, for example, utilizing a standard graphics package presenting user-selectable options for line graphs, bar charts, and pie charts.

Expert operators may be consulted in providing a library of expert rules 910. This library includes user-selectable subroutines establishing cause and effect between TOTi values, operator decisions, truck status (e.g., full or empty), grade, width of road, curvature of road, quality of road surface, multiple vehicle transit rate, environmental conditions, and maintenance issues.

A modeling engine 912 may also be provided, for example, to apply the library of expert rules 910 in analyzing other aspects of vehicle performance. Thus, for example, a sick haul truck may be diagnosed by use of $TOT_i$ values. It is then possible to delimit the field of haul trucks to those having similar $TOT_i$ performance issues and to provide a model associating the $TOT_i$ values with operator events or mechanical events contributing to the $TOT_i$ values.

The database 140 may optionally be provided with a maintenance log for the fleet of vehicles. A maintenance log reporting agent is, accordingly, able to combine vehicle operational data reported through the CAN (see FIG. 2) with maintenance or repair events. The data tables may be linked, for example, through use of SQL reporting language.

Based upon the interpretation and outcomes of user interaction with program functionalities of bar 902, a scheduler 916 is provided to automate operator training and maintenance events. Thus, a haul truck may be replaced in its normal usage by another truck, or a sick truck may be placed on light duty until maintenance facilities are available to address a diagnosed need for maintenance or repair.

Variants of heat map 600 may include, for example, time progression series through a day, month or other interval of time. While heat map 600 presents data for a single operator, it is possible to average data for groups of operators, such as experienced operators versus non-experienced operators or operators who have received a certain type of training versus those who have not received the training. This average data may be retrieved from storage on database 140 and utilized in step 304 (see FIG. 3) to define a new target speed curve as the basis for comparison. Outcomes from these types of studies may be utilized to facilitate operator education.

The program functionalities of bar 902 may be classified to address causation types 918, such as roads, trucks, operators and other causation types associated with problematic $TOT_i$ values. Thus, the TOTi values serve as a diagnostic indicator leading to: (1) a diagnosis of causation type, and (2) scheduling for a resolution to resolve the causation type in an effort to make haulage operations more efficient. Once the diagnosis of causation type is made, the scheduler 916 is available to schedule an appropriate resolution event as represented in resolution bar 820. Thus, for example, where the program functionalities 902 and analysis of associated processing results indicates that roads are a causation type associated with high $TOT_i$ values, the scheduler 916 may be utilized to schedule road maintenance or redesign for purposes of reducing the opportunity gaps 708, 808 as represented in FIGS. 7 and 8. Thereafter, performance of actual work in the road maintenance or redesign makes haulage operations more efficient, as initiated by the assessment of high $TOT_i$ values.

In another example, where the causation type is attributed to the haul truck itself, scheduler 816 may schedule for maintenance or repair of the haul truck, or else the haul truck may be reassigned to lighter duty and replaced in its original role by a stronger truck for purposes of reducing the opportunity gaps 708, 808 as represented in FIGS. 7 and 8. Similarly, where the causation type is attributed to the operator, scheduler 916 may schedule for training of one or more operators who share similar underperformance issues, in order to reduce the opportunity gaps 708, 808. Other causation types may result from a need to reschedule, For example, inclement weather or overwork of the operators as a group, which may necessitate activity by scheduler 916 in assisting with the reschedule of mine operations.

Working Examples

The following examples teach by way of illustration, and not by limitation. Accordingly, what is shown below should not be used in an undue manner to inappropriately impose limits on what is claimed.

Example 1: Operator Training Evaluation

Post-processing 312 by use of program functionalities 802 may entail comparing $TOT_i$ values for the same haul truck as it is driven by different operators. Thus, $TOT_i$ data for one such operator or the group of operators on average may be used to define the target speed curve in step 304 (see FIG. 3), and utilized for comparison purposes against individual operators or other groups of operators. Thus, for example, $TOT_i$ results may be used to measure the effectiveness of training administered to one group of operators versus another group of operators who have not received the training. The sorting of data may also be temporal in the sense that the same comparison may be made comparing the same operators before and after the training is administered. In this manner it is possible to ascertain by comparison what are the best driving practices to accelerate mine production without creating unsafe driving conditions and without improperly operating the haul trucks. Outcomes from these types of studies may also be utilized to facilitate operator education.

Example 2: Operator Training

Operator education may be as simple as providing an individual operator with an in-cab display of heat map 600 for his or her personal operation of a vehicle. The operator may, consequently, be able to see areas where he or she is underperforming in context of transit time values relative to other operators, and to take responsive remedial action.

Example 3: Sick Truck

The program functionalities 902 may utilize vehicle analytics to diagnose what may be referred to as a sick truck. In many instances, a manufacturer-provided alarm will indicate a need for service. Even so, many instances exist where the truck is underperforming without triggering a manufacturer alarm. Where, for example, a single haul truck consistently underperforms in a $TOT_i$ context on a segment of road no matter which operator is driving the truck, this may indicate a need for maintenance or repair of the haul truck. By way of example, one cause of this type of occurrence may be a faulty blower (turbocharger) where the situation has not yet reached a state that triggers a vehicle alarm. Other causes may include, for example, a need for engine or transmission overhaul. It will be appreciated that expert review of truck operating data emanating from the CAN 200 may be utilized to diagnose these types of operating problems.

Example 4: Safety/Vehicle Abuse Issues

Minimization of the $TOT_i$ values may enhance vehicle and operator safety in that the haul truck will be traveling at an optimum speed for any particular road segment. But this is only the case where the operator is not being unsafe by driving too fast or using the wrong gear for a particular speed. In some instances, $TOT_i$ values that are less than target time values may indicate a need for managerial intervention in order to promote safety or reduce abuse of equipment. By way of example, it may be observed that $TOT_i$ values by the same driver over the same stretch of road diminish in the last hour before shift change as operators hurry to get home. This should preferably but optionally be done all the time if the acceleration is not unsafe and does not abuse the equipment. On the other hand, managerial intervention and training may be required if the practices resulting in the acceleration are unsafe or abuse the equipment.

Those of ordinary skill in the art will appreciate that the foregoing discussion may be subjected to insubstantial changes without departing from the scope and spirit of the invention. Accordingly, the inventors hereby state their intention to rely upon the Doctrine of Equivalents if needed to protect the full scope of the invention that is claimed.

The invention claimed is:

1. A method of optimizing a travel speed for a vehicle at a remote location, comprising:
   dividing a road to be traversed by the vehicle into a plurality of predefined road segments;
   defining a target speed curve for the vehicle, the target speed curve correlating a plurality of target vehicle speeds for at least one travel condition;
   determining a target transit time value for the vehicle in transiting each of the plurality of predefined road segments, wherein said determining a target transit time value for the vehicle includes utilizing the target speed curve;
   ascertaining an actual transit time value for the vehicle as the vehicle travels over at least one of the predefined road segments;
   comparing the target transit time value and the actual transit time value for the at least one predetermined road segment to provide a comparison outcome, wherein the comparison outcome provides a time over target value calculated as a difference between the target transit time value and the actual transit time value; and
   adjusting a travel speed for the vehicle over at least one of the plurality of predefined road segments to minimize the time over target value.

2. The method of claim 1, wherein the at least one travel condition comprises one or more selected from the group consisting of road grade, load state, environmental condition, road condition, and altitude.

3. The method of claim 1, wherein said defining a target speed curve for the vehicle comprises:
   defining target uphill speeds for the vehicle in a loaded condition and an unloaded condition;
   defining target downhill speeds for the vehicle in the loaded and unloaded conditions; and
   defining target level speeds for the vehicle in the loaded and unloaded conditions.

4. The method of claim 3, wherein the target uphill speeds for the vehicle in the loaded and unloaded conditions vary in a non-linear manner with road grade.

5. The method of claim 3, wherein the target downhill speeds for the vehicle in the loaded and unloaded conditions vary in a non-linear manner with road grade.

6. The method of claim 1, wherein the method further comprises
   using the comparison outcome as a threshold indicator to invoke post-processing to identify a causation type,
   associating the causation type with a resolution activity to address the causation type,
   scheduling work to provide the resolution activity, and
   performing the work as scheduled.

7. The method of claim 6, wherein the causation type is selected from the group consisting of roads, trucks, operators and scheduling.

8. The method of claim 1, further comprising a step of generating a heat map associating the plurality of predetermined road segments with the comparison outcome.

9. The method of claim 8, wherein the step of generating a heat map includes displaying a plurality of callouts along the road, the callouts defining the plurality of road segments.

10. The method of claim 8, wherein the step of generating a heat map includes classifying values associated with the comparison outcome, assigning colors to the respective classifications according to a colorized classification scheme, and graphically displaying the road with the predetermined road segments according to the colorized classification scheme.

11. The method of claim 1, wherein the target transit time value and the actual transit time value are intrinsic time values.

12. The method of claim 11, wherein the intrinsic time values are selected from the group consisting of velocity and acceleration.

13. The method of claim 1, wherein the remote location includes a wireless telemetry system that communicates with a monitoring station, and the vehicle includes a vehicle network, and
   wherein also the step of ascertaining the actual transit time value includes uploading the actual transit time value from the vehicle network to the wireless telemetry system and thereafter the monitoring station.

14. The method of claim 13, wherein the monitoring station includes a database and a graphical user interface that facilitates user-directed reporting from the database,
   wherein also the step of determining a target transit time value includes running a user-directed report.

15. The method of claim 14, wherein the step of running a user-directed report includes reporting from actual transit time values that occur when a particular operator is operating the vehicle.

16. The method of claim 14, wherein the step of running a user-directed report includes reporting from actual transit time values that occur when a particular operator is operating a different vehicle.

17. The method of claim 14, wherein the step of running a user-directed report includes reporting from actual transit time values that occur when a plurality of operators are operating the vehicle.

18. The method of claim 14, wherein the step of running a user-directed report includes reporting from actual transit time values that occur when a plurality of operators are operating a different vehicle.

19. A system for optimizing a travel speed for an off-road vehicle, comprising:
- a telecommunications network,
- a vehicle including
  - a vehicle network having one or more sensors operatively associated with the vehicle for providing data selected from the group consisting of at least one of time and a speed of the vehicle,
- a transmitter configured to upload the data to the telecommunications network;
- a processing system operatively associated with the telecommunications network to operate on the data;
- the processing system being configured with program logic to implement the method of claim 1.

20. A non-transitory computer-readable storage medium having computer-executable instructions embodied thereon that, when executed by at least one computer processor cause the processor to perform the method of claim 1.

* * * * *